United States Patent [19]

Douglas

[11] Patent Number: 4,800,400
[45] Date of Patent: Jan. 24, 1989

[54] ELECTRONIC IMAGE PRINTING APPARATUS

[75] Inventor: Lawrence M. Douglas, South Easton, Mass.

[73] Assignee: Polaroid Corporation, Cambridge, Mass.

[21] Appl. No.: 158,585

[22] Filed: Feb. 22, 1988

Related U.S. Application Data

[63] Continuation of Ser. No. 104,770, Oct. 5, 1987, abandoned.

[51] Int. Cl.⁴ .............................................. G01D 15/00
[52] U.S. Cl. ................................. 346/107 R; 346/145
[58] Field of Search ................... 346/160, 107 R, 108, 346/145, 150; 400/119, 207, 208, 624; 358/300, 302; 101/DIG. 13

[56] References Cited

U.S. PATENT DOCUMENTS

| | | | |
|---|---|---|---|
| 4,047,192 | 9/1977 | Johnson et al. | 354/83 |
| 4,179,183 | 12/1979 | Tateoka et al. | 350/6.1 |
| 4,467,369 | 8/1984 | Alston | 358/332 |
| 4,547,038 | 10/1985 | Mori | 350/6.5 |
| 4,564,853 | 1/1986 | Egan | 346/160 |
| 4,566,015 | 1/1986 | MacKenzie | 346/107 |
| 4,589,745 | 5/1986 | Plummer | 354/4 |
| 4,610,536 | 9/1986 | Smyth et al. | 355/38 |
| 4,630,128 | 12/1986 | Gokita | 346/160 |
| 4,641,184 | 2/1987 | Alston | 358/75 |
| 4,673,956 | 6/1988 | Kobayoshi | 346/160 |

Primary Examiner—Arthur G. Evans
Attorney, Agent, or Firm—Leslie J. Payne

[57] ABSTRACT

There is disclosed an electronic image printing apparatus which generates and prints images onto successive ones of a plurality of film units which are processed in the apparatus. The apparatus includes mechanisms for synchronously operating components involved in the printing operation.

17 Claims, 7 Drawing Sheets

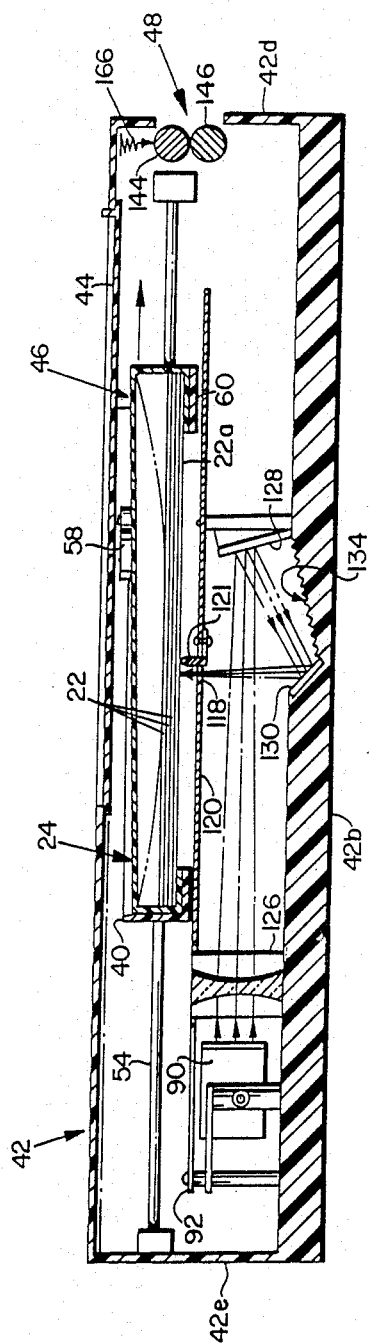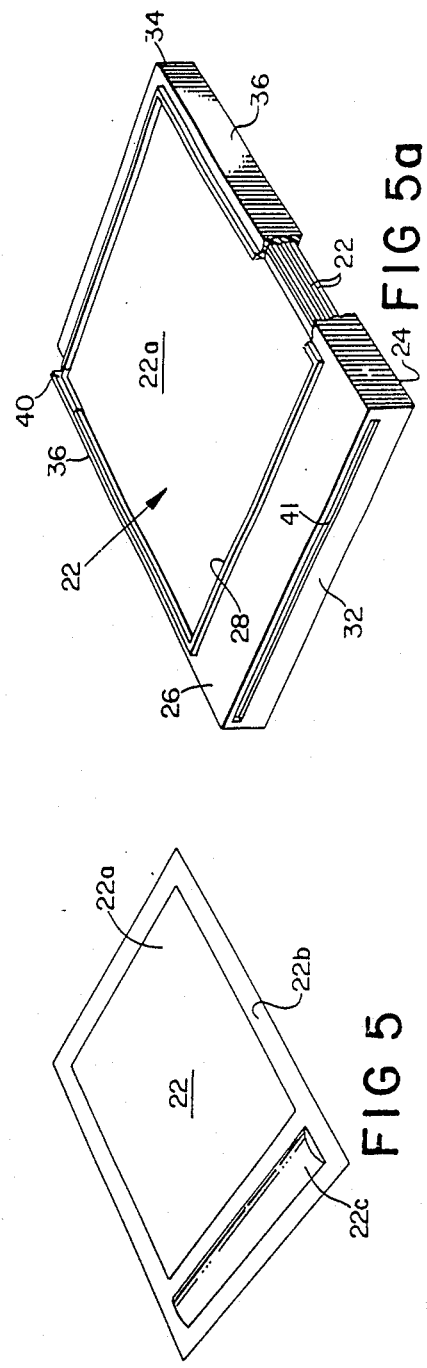

ELECTRONIC IMAGE PRINTING APPARATUS

This is a continuation of application Ser. No. 104,770, filed Oct. 5, 1987, now abandoned.

BACKGROUND OF THE INVENTION

The present invention relates generally to an improved electronic imaging printing apparatus for optically printing and developing images on image recording material as such material is advanced along a preselected path in the apparatus.

Various forms of electronic imaging printers which generate and record images representative of electronic information, on image recording material are well known in the art.

One known kind of printer utilizes a cathode ray tube for presenting information in visual form on a screen while image recording material moves therepast so as to capture the visual information. Exemplary of printers of this type is one described in U.S. Pat. No. 4,467,369 commonly assigned herewith. Another known type is described in U.S. Pat. No. 4,179,183, wherein there is disclosed a light beam scanning apparatus for use as an electronic image printer. Included is a polygonal mirror rotated at a constant speed and a lens system which focuses the scanning beam deflected by the polygonal mirror onto an image recording surface to be scanned. There are disadvantages associated with such a system. For instance, the repeatability of the scanning action provided by the mirror is less than entirely reliable due to the precision required to rotate the mirror and the wear associated with such rotation. Both of these factors can lead to unacceptable tilting of the scanned lines. Therefore, the quality of the resultant image especially in photographic quality prints, is less than desired. It will be appreciated that misplacement of even one scanning line can affect adversely the quality of the images produced.

Still another type of electronic image printing apparatus is disclosed in U.S. Pat. No. 4,564,853, commonly assigned herewith. In this patent there is described XY scanning galvanometer/mirrors which addressably line scan a laser beam that is modulated in response to the electronic image data across the surface of the liquid crystal light valve and to thereafter reflect a beam of incoherent light through a liquid crystal light valve to expose photosensitive material through a filter wheel having red, green and blue filters.

Yet still another kind of electronic imaging printer is described in commonly assigned U.S. Pat. No. 4,566,015, wherein there is disclosed an image recording apparatus for recording images on an advancing sheet of photosensitive material by using light emitting diodes in a line exposure array. The diodes are oscillated to displace each diode along a line of exposure.

SUMMARY OF THE INVENTION

In accordance with the principles of the present invention there is provided an improved electronic image printer. Included in the printer is a housing assembly having means for allowing entry and removal of a cassette which holds a plurality of individual image recording units. Disposed in the housing assembly is means for mounting the assembly for movement in at least a printing direction along a predetermined path. Provision is made for means for providing at least a beam of light and means for modulating the light responsive to electronic signals corresponding to an image of a subject selected for printing. There is provided means operable for scanning the modulated light beam across a preselected scanning line of the recording units. Means are provided for optically directing the modulated light beam to the scanning means and from the light scanning means to an image plane of one of the units. For driving the cassette in the printing direction as the light scanning means scans the modulated light beam across the scanning line there is provided a cassette driving means, whereby the combination of movement provided by the light scanning means and the cassette driving means results in a raster scan image on the image recording unit by the modulated light beam. In the housing assembly means are disposed for ejecting successive scanned recording units from the cassette and the housing assembly.

In an illustrated embodiment, the ejecting means includes means for processing the recording units, wherein the processing units are of the self-developing photosensitive film type. The processing means includes a pair of processing rollers which is operable to advance each film unit from the cassette and housing assembly.

In another illustrated embodiment the means for providing light includes a plurality of light emitting elements disposed in spaced apart relationship in a generally horizontal plane and energizable for emitting light in respectively different spectral wavelengths.

In another illustrated embodiment the means for modulating the light beam includes means responsive to rotation of a driving motor for controlling the presentation of data to the light emitting elements, which presentation is in synchronization with the scanning of the light scanning means and the cassette driving means.

In the embodiment of the last noted type, the means for controlling presentation of data includes an encoder wheel coupled to an output shaft of the driving motor.

In another illustrated embodiment, the light scanning means includes an oscillatable mirror assembly having a cam following member, a driving motor, and a camming member driven by the driving motor. The camming member drives the mirror assembly so as to scan and rescan the line area, so that the scanning of the mirror assembly is done in equal increments regardless of rotational speed of the driving motor.

In another illustrated embodiment, the cassette driving means includes a lead screw rotatably driven by the driving motor.

In another illustrated embodiment, the optical means includes a preobjective lens system which insures that the beam of light is generally in focus on the image plane across the scanning line.

Among the other objects of the present invention are, therefore, the provision of an apparatus which simply and reliably prints images on image recording material; the provision of an apparatus which is portable and inexpensive to both manufacture and operate; and, the provision of an apparatus which prints and develops a plurality of photosensitive film units with virtually no distortion of the image.

These and other objects and features and the invention itself will become apparent from the following description when taken in conjunction with the accompanying drawings wherein like structure throughout the several views are indicated by like reference numerals.

BRIEF DESCRIPTION OF THE DRAWINGS

FIG. 4 is a longitudinal view taken in cross-section showing other components of the preferred embodiment;

FIG. 5 is a perspective view of a film unit usable with the electronic image printing apparatus of the present invention;

FIG. 5A is a perspective view of a film cassette usable for holding the film units of the type shown in FIG. 5;

DETAILED DESCRIPTION

Figure 1:
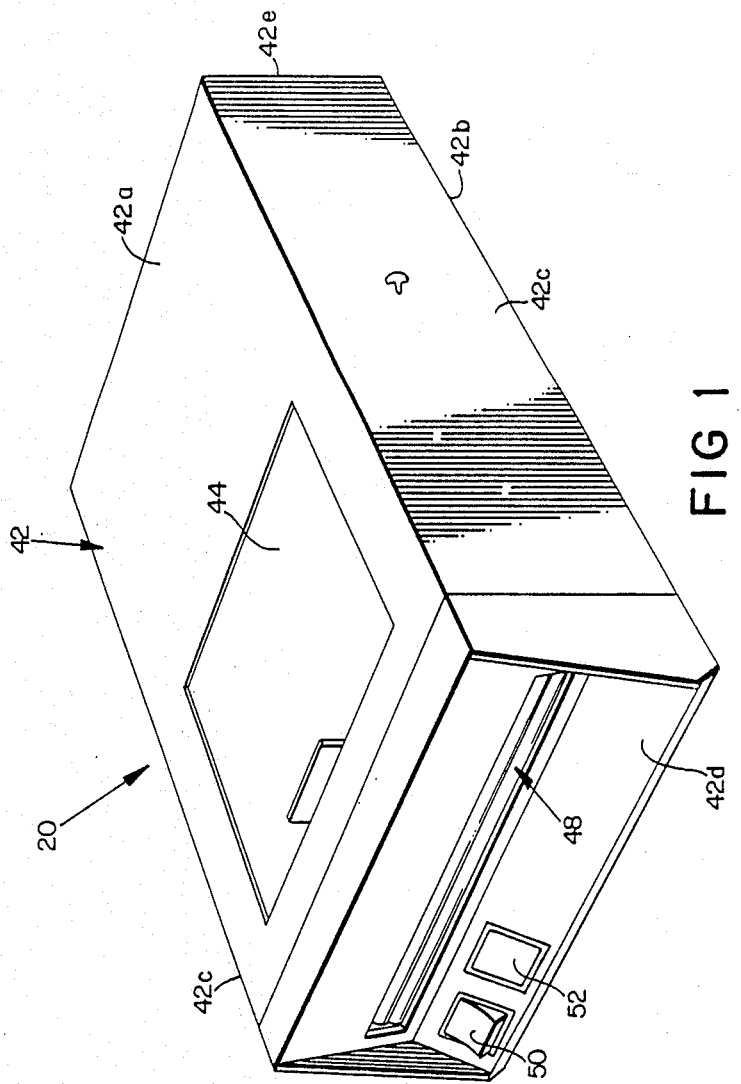
FIG. 1 is a perspective view of a preferred embodiment of an electronic image printing apparatus made in accordance with the principles of the present invention.

Reference is made to FIGS. 1-10 for showing a preferred embodiment of an electronic image printing apparatus of the present invention which is designated generally by reference numeral 20. The electronic image printing apparatus 20 is intended for use in generating and developing images on individual ones of a plurality of photosensitive film units 22 (FIG. 5). These units are of the self-developing type, such as the kind manufactured by Polaroid Corporation. Other kinds of image recording materials are contemplated for use. Whatever kinds are selected though, they would of course be sensitive to exposure by a suitable source of energy used for recording purposes. Typically, each of the film units 22 (FIG. 5) includes an image forming area 22a bordered by a frame 22b having a rupturable pod 22c of processing fluid disposed along a leading marginal edge thereof. Each of the film units 22 is adapted to be processed following exposure by the electronic image printing apparatus 20 in a manner to be described. As is known, the pod 22c is ruptured when it is advanced to and between a pair of pressure applying spread rollers, to be described, which cause the processing fluid in the film unit to be spread between positive and image receiving elements (not shown) of such units. This action serves to initiate the diffusion transfer process, whereby latent images on the image forming area 22a are developed. The film units 22 are held in a stacked array in a film cassette or box 24.

Referring to the film cassette 24 (FIG. 5A), it has a generally parallelpiped structure and is made of a suitable opaque plastic material. The parallelpiped structure includes a top wall 26 which defines a generally rectangular light exposure aperture 28 which is arranged to be in registry with the image forming area 22a of successive ones of the film units 22. The film cassette 24 includes a bottom wall 30 (FIG. 2) leading end wall assembly 32, rearward wall 34 and opposing side walls 36. A spring platen or pack spring (not shown) is arranged to provide a yieldable platform for the film units 22 so as to feed successive units to a focal plane defined by the aperture 28. It should be noted that in this embodiment, the film cassette 24 is arranged so that the aperture 28 faces downwardly. Accordingly, the image area 22a of each of the successive film units 22 to be exposed is facing downwardly with respect to the topside of the electronic image printing apparatus 20. Like other kinds of film cassettes of this general type, the one of the present embodiment includes a generally planar battery 38 and a dark slide (not shown). The battery 38 can provide electrical power for certain operations of the apparatus 20 such as powering the control circuit in the event of an electrical power outage. For ejecting each of the film units 22, the top wall 26 of the film cassette 24 is formed with an elongated recess or cutout 40 which is constructed to allow a picking mechanism, to be described later, to push successive exposed film units 22 through an exit opening 41 formed in the leading end wall assembly 32.

Reference is now made to FIGS. 1-4 for better showing a portable housing assembly 42 which is made essentially of opaque plastic or other suitable opaque lightweight materials. The housing assembly 42 includes a parallelpiped structure having top wall 42a, bottom wall 42b, opposing sidewalls 42c and respective front and back walls 42d and 42e. Formed in the top wall 42a is an opening which cooperates with a door 44 mounted for slidable movement between open and closed positions. Whenever the door 44 is open, it allows entry and removal of the film cassette 24. The film units 22 are intended to be ejected from the film cassette 24 and are advanced through the front wall 42d. In this regard, the front wall 42d includes an exit or discharge slot 48 which is sized and shaped to allow ejection of a dark slide and a processed film unit 22 therethrough. The front wall 42d can include several appropriate switches and indicators. In this embodiment, the front wall 42d has mounted thereon an on-off switch 50 which when actuated effects commencement of an image generating and recording cycle. Also, an indicator lamp 52 is mounted on the front wall 42d for purposes of indicating that the apparatus 20 is operating.

A film cassette carriage 46 (FIGS. 2-4) is mounted in the interior of the housing assembly 42 so as to move reciprocally along a predetermined axial path between an image printing start position and a film unit withdrawal position. The path is defined by a pair of spaced apart and parallel longitudinally extending guide rods 54. Opposite ends of the guide rods 54 are suitably supported in structure forming part of the housing assembly 42. Laterally extending from each side of the film cassette carriage 46 is a pair of linear bearing assemblies 56, each pair of which is mounted on a respective guide rod 54 for supporting the film cassette carriage 46 for sliding movement.

For releasably clamping the film cassette 24 in the film cassette carriage 46 there is provided a pair of clamping arms 58. Each of the clamping arms 58 is pivotally mounted on top of a respective one of the linear bearing assemblies 56. When the film cassette 24 is placed onto the film cassette carriage 46, the clamping arms 58 can be pivoted to engage the bottom wall 30 in a manner which causes the film cassette 24 to be securely mounted. Thus, undesired movement of the film cassette 24 caused by vibrations and the like do not occur.

The film cassette carriage 46 has a ledge portion 60 defining an aperture 62 which is sized and shaped so that the aperture 28 and, therefore, the entire image area 22a of successive ones of the film units 22 can be exposed. The film cassette carriage 46 is also formed with a pick slot only partially shown at 63 (FIG. 7) which allows picking of an exposed film unit 22 from the film cassette 24.

Figure 10:
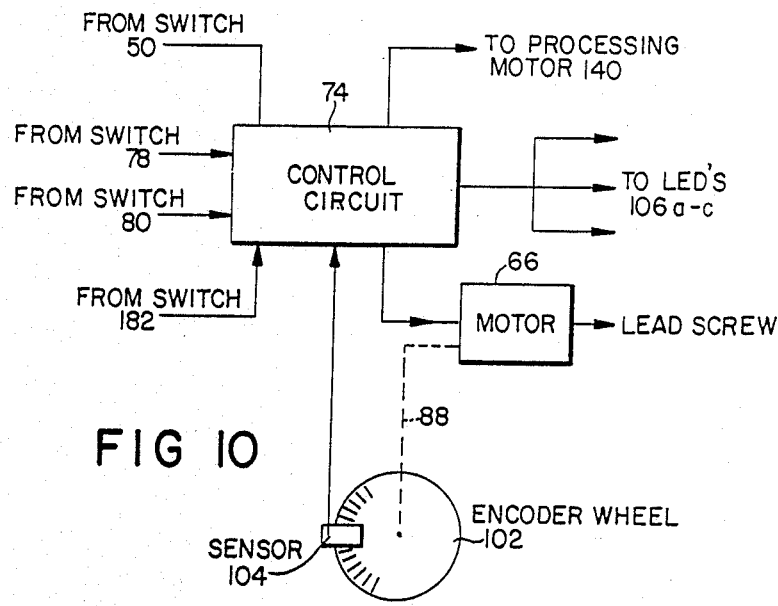

The present invention includes compact and integral scanning driving mechanism or means 64 which is operable for simultaneously operating both fast and slow scanning movements. Reference is made to FIGS. 2–4 and 6 for showing the scanning driving mechanism 64. For effecting the slow scan movement there is provided an electric driving motor 66, a gear reduction arrangement 68 and a carriage advance lead screw 70 having threadedly coupled thereto a coupling nut 72 (FIG. 3). The coupling nut 72 is connected to the film cassette carriage 46. The driving motor 66 starts and stops responsive to appropriate signals from the apparatus control circuit 74 (FIG. 10). The driving motor 66 is appropriately energized at the commencement of an image generating and recording cycle and is effective to bidirectionally drive the lead screw 70 through the gear reduction arrangement 68. The lead screw 70 is supported rotatably in the housing assembly 42 so as to be aligned with the guide rods 54. Rotation of the lead screw 70 advances the cassette carriage 46 roughly less than one micron per revolution of the lead screw. Towards this end the lead screw 70 is a high precision type having, for example a pitch of 80. The coupling nut 72 is connected to the bottom of a linear bearing assembly 56 by a flexible strap 75. The coupling nut 72 is thus prevented from rotation and thus, rotational movement of the motor's output shaft is converted to axial movement of the cassette carriage 46. This is the so-called slow scan movement of the film cassette carriage 46 which is generally transverse to the fast scan movement. The slow scan speed can, of course, be varied by varying the output speed of the driving motor 66. As noted, the flexible strap device 75 mechanically connects the coupling nut 72 to the linear bearing assembly 56. The strap device 75 is sufficiently rigid for transferring axial movement in either direction and for resisting screw torque friction. The flexible strap device 75 prevents alignment and runout errors being transmitted to the carriage 46. Moreover, the flexible strap device 75 accepts misalignment in any direction between the lead screw 70 and the guide rod 56.

A switch contact member 76 (FIG. 3) depends from the coupling nut 72 and is adapted to engage limit switches 78 and 80. Each limit switch is located respectively adjacent an opposite end of the coupling nut's movement, such as shown in FIG. 3. Selective actuation of the limit switches 78 and 80 results in ending of linear movement of the film cassette carriage 46 by effectively stopping operation of the driving motor 66.

Simultaneously with the slow scan movement, there is provided fast scanning movement. Fast scanning is considered movement of modulated light spots across the width of the film units 22. Both the slow and fast scanning movements provide for raster scan imaging on the image forming area 22a.

Reference is made to FIGS. 2–4 and 6 for showing structure which is operable for performing the fast scanning movement. Included is an oscillatable scanning mirror assembly indicated generally by reference number 82. The scanning mirror assembly 82 is directly oscillated by a mirror driving mechanism 84. The mechanism 84 includes a rotatable cam 86 directly connected to an output shaft 88 of the driving motor 66. The scanning mirror assembly 82 includes a generally rectangular mirror 90 mounted for oscillation about a vertical axis defined by an upstanding support 92. The scanning mirror 90 serves to deflect the bundles of light being emitted from a light source to be described. Essentially, the scanning mirror 90 scans the film plane with a plurality of light spots. The scanning mirror 90 has low mass and, thus, is capable of being more easily controlled. In this embodiment, the scanning mirror 90 is intended to be rotated preferably by about 20 degrees and includes overtravel. This is sufficient to insure that an exposure or scanning line extends a distance greater than the entire width of each of the imaging areas 22a exposed. This accommodates for slight misalignment of components.

A cam follower 94 is integral with the scanning mirror 90 and has one end biased against a camming surface 96 of the cam 86 by a biasing spring 98. The spring 98 is connected to and between the cam follower 94 and a post in the housing assembly 42. The spring 98 yieldably urges the mirror 90 to the starting scan position. As the camming surface 96 rotates in response to rotation of the output shaft 88, the cam follower 94 will effect mirror oscillation . A significant advantage of having the scanning mirror 90 contact the cam 86 is that this relationship insures that the mirror provides uniform displacement of a pixel or image spot from one spot on the film to the next across the image forming areas 22a of the film units 22 regardless of rotational speed variations of the driving motor 66. In contrast, known galvanomirrors used for scanning insure only a uniform rate of mirror oscillation or rotation and do not insure this constant placement of a pixel or image spot from one spot to the next on the film. This is very important when generating images. Hence, the cam profile establishes the position of the pixels on the film . This is significant because variations in the motor speed do not affect the placement of the pixels. Moreover, this simplifies the optics of the apparatus 20 because optical corrections need not necessarily be made to compensate for displacement variations.

It will be pointed out that the cam profile is selected to allow the scanning mirror 90 to print or expose along equal increments of the film plane with the light spots being representative of the electronic data and being delivered at a fixed frequency. This assumes the output shaft 88 rotates at a constant speed. The cam profile is generally symmetrical so that during one half of the revolution thereof, the scanning mirror 90 is displaced in a printing or exposing direction, while the remaining half is considered to be the rescan direction. The scanning mirror 90 returns to the initial or start scan position following rotation of the cam profile. The rescan in this embodiment while not effective to cause further printing or retracing does allow, for example, a blue light emitting diode to remain on for added exposure of such spectral wavelength along the exposure line. Since the cam profile is symmetrical, the scan and rescan time will be the same. However, the present invention acknowledges that the scan and rescan time can be altered. If it is desired to allow for a shorter rescan time then, for example, the mass of the scanning mirror 90 can be reduced.

Figure 9:
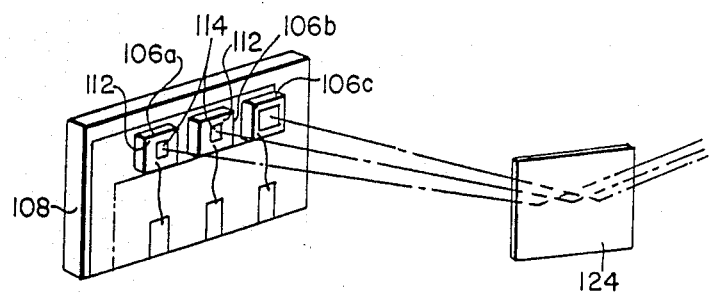
FIG. 9 is an enlarged diagrammatic view showing the light emitting elements; and, FIG. 10 is a block diagram of control circuitry for use in the apparatus of the present invention.

For regulating firing frequency of the light source there is provided an encoder mechanism 100. Included in the encoder mechanism 100 is an encoder wheel 102 fixedly mounted to the output shaft 88 and which has a plurality of generally radially extending markings (not shown) which are sensed by a conventional optical sensor 104 of the type used in conjunction with encoder wheels. The optical sensor 104 transmits and receives light through transmissive portions of the encoder wheel 102. The optical sensor 104 which generates encoder ticks reflects the variations in the rotational speed of the output shaft 88. In this embodiment, each time a signal is sensed by the optical sensor 104, the light source, as will be explained, is energized to emit light. In this embodiment, each encoder tick of the sensor 104 is transmitted to a data clock (not shown) in the control circuit 74. Thereafter, the encoder tick responsive clock pulses are transmitted to a microcomputer (not shown) in the control circuit. Image data received by the microcomputer, from any well-known source, such as a magnetic tape or disc is thereafter directed to circuitry (not shown) which modulates the intensity of the output of light emitting diodes 106a–c (FIG. 9). Of course, the electronic image data may be enhanced. Thus, energization of the light emitting diodes 106a–c is a function of the speed of motor output shaft 88 since the encoder ticks are dependent upon the rotational displacement of the encoder wheel 102.

The three light emitting diodes 106a–c are capable of generating color images. While the present embodiment discloses the use of light emitting diodes 106a–c, the present invention contemplates other kinds of energy emitting sources, such as laser diodes. For instance, for laser diodes to be effectively utilized, the image recording material must be sensitive to exposure of the laser's spectral wavelengths.

Figure 6:
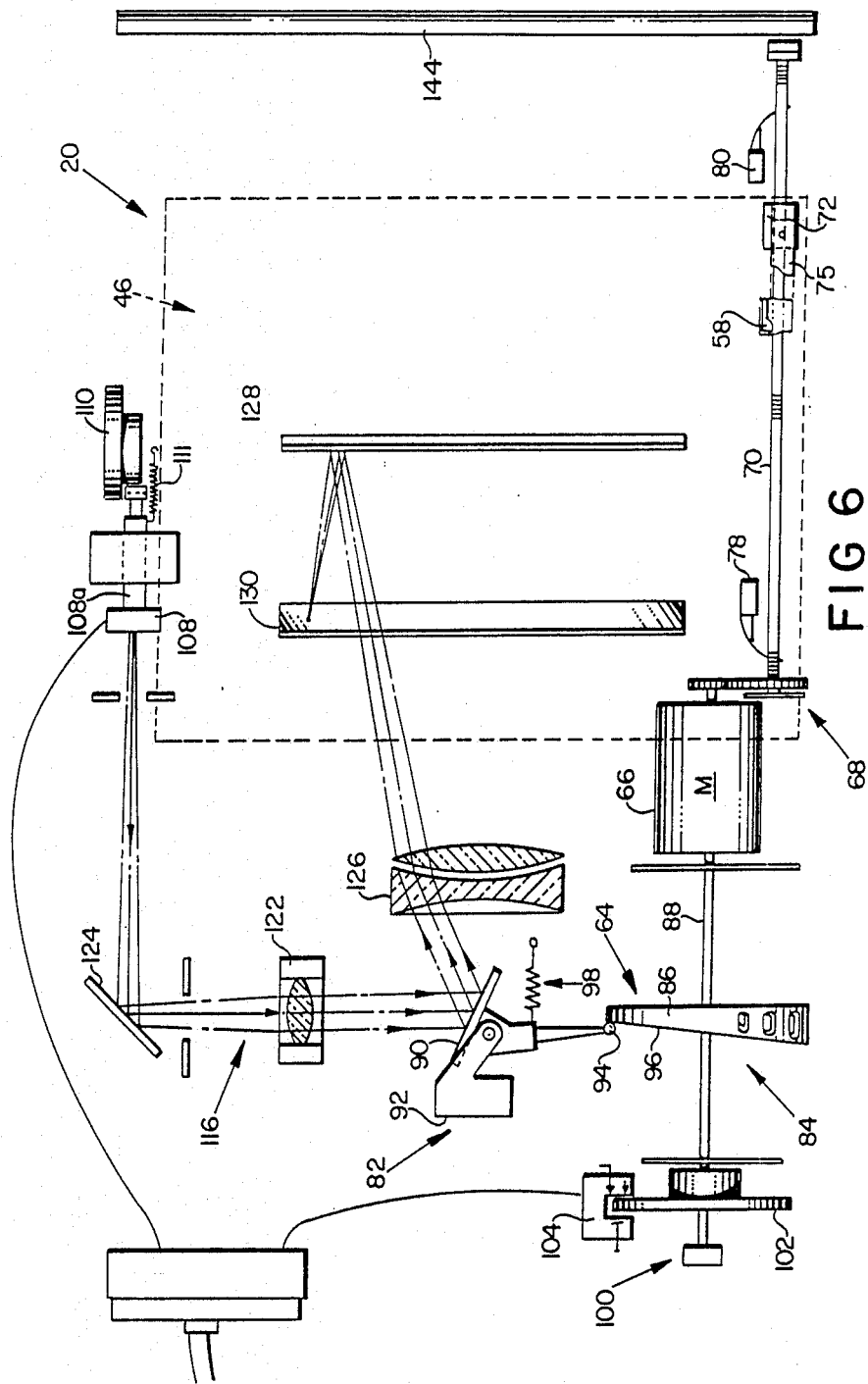
FIG. 6 is a diagrammatic planar view of components forming the electronic image printing apparatus of this invention.

As shown in FIGS. 6 and 9, the light emitting diodes 106a–c are mounted on a linearly adjustable planar board assembly 108. The board assembly 108 is positioned at a location which insures that each bundle or beam of light spots from respective ones of the light emitting diodes 106a–c is focused at the film plane. This embodiment also discloses means for manually adjusting the linear positioning of the board assembly 108 in the event that focusing of the light emitting diodes 106a–c has not been set accurately. Towards this end, there is provided a focusing cam 110 (FIGS. 2 and 6) which is rotatably mounted in the housing assembly 42. The focusing cam 110 is rotated by a tool(not shown) which cooperates with circumferentially spaced notches formed in the side thereof. The tool can fit through an opening (FIG. 1) in one of the sidewalls 42c. The board assembly 108 includes an elongated follower 108a which has its end biased against the focusing cam 110 by a spring 111. Rotation of the focusing cam 110 in either direction will be effective to cause linear displacement of the board assembly 108.

The light emitting diodes 106a–c are arranged in spaced apart and generally horizontal relationship relative to the base of the housing assembly 42. The light emitting diodes 106a–c when energized respectively produce red, green and blue spectral wavelengths. It should be noted that the light emitting diodes 106a–c can have other spatial arrangements so long as the light produced by each light emitting diode reaches essentially the same spots on the image forming area 22a. The light emitting diodes 106a–c provide spots or pixel sizes adequate for exposing the film to provide for desired image resolution. In this embodiment, the size of each pixel produced by the light emitting diodes 106a,b is 0.0062×0.003 inches. In this embodiment, the size of the blue light diode 106c is larger than the others. Greater light emitting area is generally needed with blue light emitting diodes since the blue light intensity is generally less than the red and green light intensity. The larger blue pixel while relatively blurred will not appear blurred to the human eye. Size and shape configuration of each pixel are provided by apertures 114 in a conductive masking layer 112 (FIG. 9) integral with each light emitting diode. The layer 112 is used from coating material which bonds each conductor to the light emitting diodes. The lateral spacing between the light emitting diodes 106a–c is selected for insuring that the spots generated by each exposes preselected successive adjacent spots along the exposure or scanning line on the film 22 in the fast scan direction. Color information is therefore processed in a predetermined sequence.

In this embodiment, the sequencing is performed in a manner whereby the modulated beam of red light falls on a first spot of the film followed in time, by modulated beams of green and blue light. It will be appreciated that the same film area or spot will, therefore, be imaged consecutively by the three noted colors. More particularly, while the first spot is being imaged with green light, the next successive spot along the scanning line of exposure in the fast scan direction is being imaged with red light. After the first spot has been consecutively imaged with red and green light, the beam of blue light will be imaged on the first film spot. As the blue light is being imaged on the first film spot, the red light is being imaged on a third film spot, and the second film spot, which has been previously imaged with red light, is being imaged with green light. Thus, the same film spot will be imaged consecutively by the three light emitting diodes 106a–c. This sequencing of colors on successive spots along the linear path is continued throughout the fast scan. The light emitting diodes 106a–c by being arranged in a horizontal manner provide a scanning action which is efficient. For example, if the scanning mirror were to scan simultaneously a plurality of lines with red, green and blue light, it will be appreciated that greater precision and control of the mirror scan would be required. This is because the scanning mirror would have to allow each of the colors to scan the same line three different times in order to image the noted three color components. Furthermore, in such a situation more electronic information would be required to be stored. Accordingly, a more complicated and precise mechanism would be otherwise required than is currently proposed.

Figure 2:
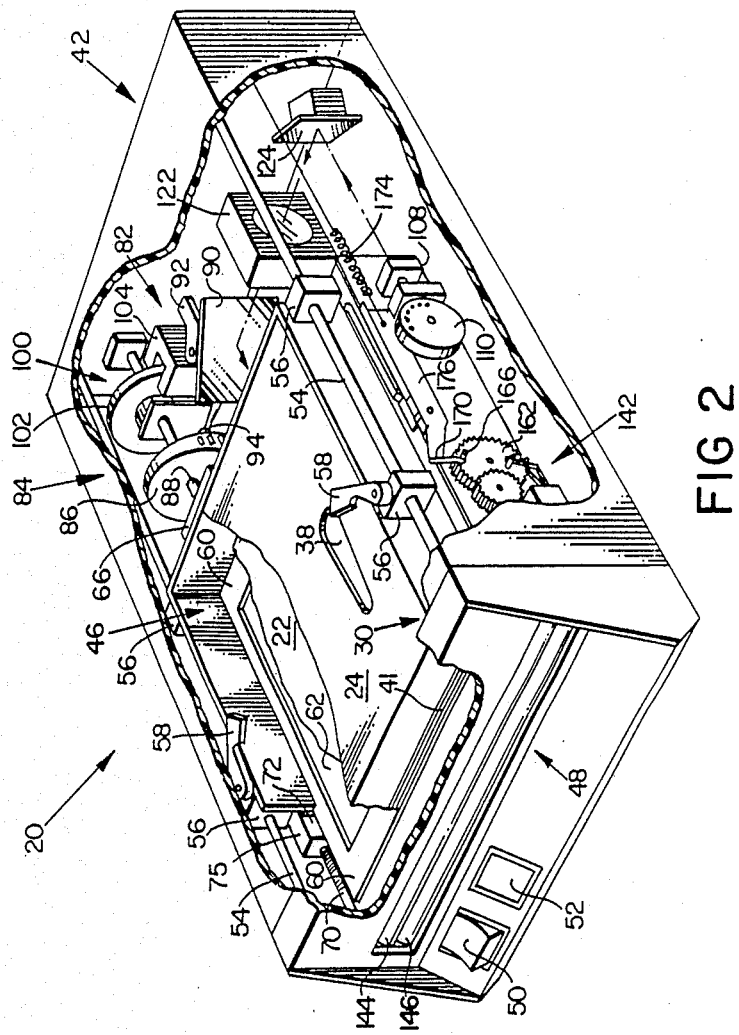
FIG. 2 is a view similar to FIG. 1 with components broken away to depict in diagrammatic form certain components of the preferred embodiment.
Figure 3:
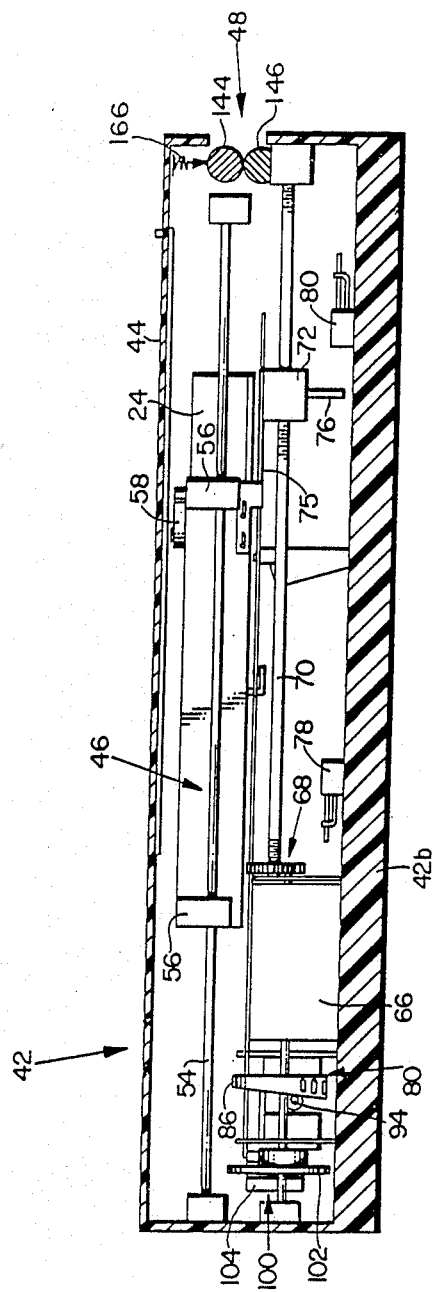
FIG. 3 is a side elevational view in cross-section showing components of the preferred embodiment.

Reference is now being made to FIGS. 2, 4 and 6 for illustrating an optical system 116 for use in the image printing apparatus 20. Essentially, the optical system 116 provides means for imaging the light bundles or beams from the light emitting diodes 106a–c onto the image forming area 22a through an elongated scanning slot 118 (FIG. 4) formed in a horizontally supported masking plate 120. The masking plate 120 is supported in the housing assembly 42 immediately adjacent the image areas 22a of the film units 22 to be exposed. The scanning slot 118 allows formation of the exposure or scanning line. The scanning slot 118 is arranged to extend across the width of the image areas being exposed. The masking plate 120 also serves to block stray light from striking undesired parts of the film. A resilient low-friction film flattener 121 (FIG. 4) is provided so as to interfere slightly with the film unit and is aligned adjacent the exposure line. The reason for this is that the flattener 121 compensates for the fact that the film units 22 are inherently flexible and not entirely flat. The film flattener 121 provides flat film at the focal plane. The drag provided by the low-friction film flattener 121 is negligible and does not impede the slow scan movement or scratch the film surface.

The optical system 116 of this embodiment is similar to the one described in U.S. Pat. No. 4,179,183. Hence, a detailed description is not believed necessary for an understanding of this invention. For understanding this invention though the optical system 116 is essentially a preobjective scanning optical system, whereby the light emitted from the light emitting diodes 106a-c can scan along a predetermined flat path. The preobjective scanning system to be described in this embodiment is but one of several which can be employed. Included in the optical system 116 is a lens group 122 which directs the beams from a stationary mirror 124 to the scanning mirror 90. From the scanning mirror 90 the beams are directed to a light converging lens group 126. From the light converging lens group 126 the beams of light strike a pair of suitably placed reflecting mirrors 128 and 130 and go through the scanning slot 118 onto the flat film plane. Of course, the mirrors 128 and 130 are of a length sufficient to allow scanning across the width of a film imaging area 22a. The lenses 122 and 126 are effective to insure that the bundle of light from each of the light emitting diodes 106a-c is focused on the exposure line. This is so despite the fact that the objective distance that the light travels from the scanning mirror 90 to various portions along the length of the slot 118 varies.

Figure 7:
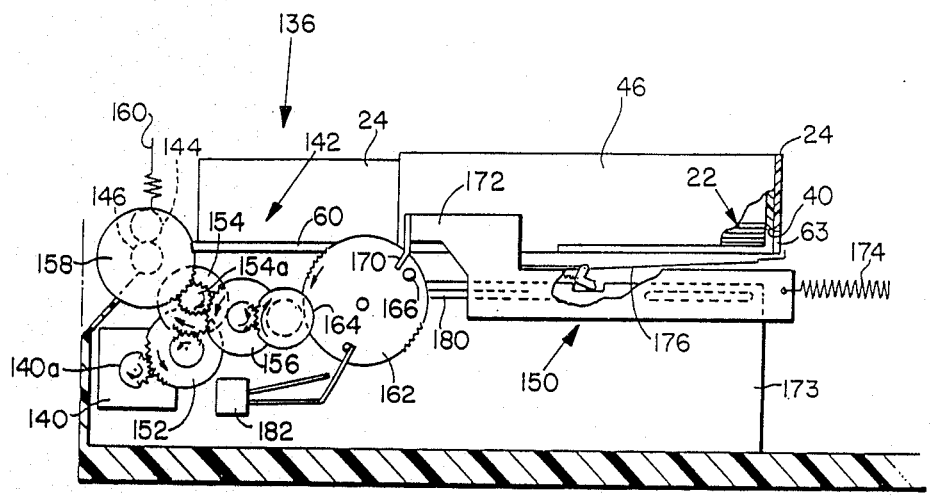
FIG. 7 is a fragmented side elevational view showing components forming part of the film processing mechanism of this embodiment.
Figure 8:
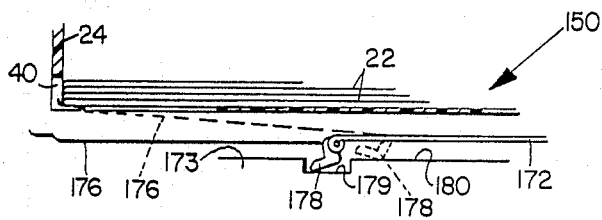
FIG. 8 is an enlarged and fragmented view showing a film picking arrangement of the present invention.

Reference is now being made to FIGS. 7 and 8 for showing a processing mechanism 136 for processing each of the exposed film units 22 subsequent to an image printing cycle. The processing mechanism 136 is similar to that described in U.S. Pat. No. 4,047,192, commonly assigned herewith. Hence, a detailed description is not believed necessary. The processing mechanism 136 provides a means for processing each of the film units 22 so as to initiate formation of a visible image therein and for advancing each film unit from the slot 41 through the exit slot 48. Essentially, the processing mechanism 136 includes a motor 140, a gear train assembly 142 for driving a pair of film processing rollers 144 and 146 and a film picking mechanism 150.

The gear train assembly 142 transfers rotation from a geared motor output shaft 140a to the film picking mechanism 150. The gear train assembly 142 includes a rotatably mounted compound driving gear 152 which drives a gear 154. The gear 154 has a smaller diametered toothed portion 154a which meshingly engages with a film pick drive gear 156 and a processing roller drive gear 158. The latter, of course, drives the processing rollers 144, 146 in a well-known manner, when the motor 140 is energized. The processing rollers 144 and 146 are supported in the housing assembly 42 and are spaced apart by a predetermined gap which gap facilitates formation of a desired processing fluid thickness used for processing the film units. A pair of springs 160 is provided, each one of which yieldably biases an end portion of the topmost processing roller 144. The processing rollers 144 and 146 provide progressive pressure on the film units 22 as the latter travel therepast.

Now referring to the film pick drive gear 156, it drives a sequencing gear 162 through a rotatably supported compound gear 164. The film picking mechanism 150 is supported for generally reciprocal movement adjacent the film cassette 24. The film picking mechanism 150 is actuated upon rotation of the motor output shaft 140a. Rotation of the output shaft 140a rotates the driving gear 152 which results in rotation of the gear 154 and its portion 154a. As a result, the sequencing gear 162 rotates in the direction of the arrows in FIG. 7. The sequencing gear 162 will make a complete revolution during the film processing cycle. The sequencing gear 162 includes a lug 166 which is arranged to engage a tab 170 at the forward end of a pick slide 172. This engagement causes sliding movement of the pick slide 172 towards the forward position of the housing assembly 42. It will be appreciated that the pick slide 172 is suitably mounted in a support wall 173 mounted in the housing assembly 42. The pick slide 172 moves against the urging of a spring 174 which has its other end attached to the housing assembly 42. The spring 174 returns the pick slide 172 to its normal at rest position when the lug 166 no longer engages the tab 170. However, upon engagement of the tab 170 by the lug 166, the pick slide 172 is advanced for a limited stroke which is effective to cause a pick arm 176 which is connected to the slide 172, to engage the film unit 22. The pick arm 176 travels through the slot 63 in the film cassette carriage 46 and cutout 40 in the film cassette 24. Continued rotation of the sequencing gear 162 will, of course, result in the pick arm 176 advancing the film unit 22 through the exit slot 41, whereby the leading edge of the exited film unit is brought into engagement with the nip of the processing rollers 144, 146. The pick arm 176 has connected thereto a cam follower 178 which rides a camming surface 180 formed in a support wall 173. As shown in FIG. 8, whenever the cam follower 178 is in a recessed portion 179 of the camming surface 180, the pick arm 176 is in the solid line horizontal position. In this regard, when the pick slide 172 is moved rightwardly as viewed in the FIG. 8, the cam follower 178 (as seen in the dotted line position) rides onto a raised portion of the cam surface 180. This causes the pick slide 172 to move upwardly, whereby the pick arm 176 follows and engages a trailing edge of the bottommost film unit 22. Continued rotation of the sequencing gear 162 causes the lug 166 to rotate, so then it will engage arms of a switch 182. The switch 182 is effective, through the control circuit 74, to stop operation of the motor 140. Engagement of the switch 182 occurs after the film unit 22 has been advanced from both the film cassette 24 and the housing assembly 42 by the processing rollers 144, 146. Accordingly, a film unit 22 can be removed by an operator. Operation of the image printing apparatus 20 is set forth below.

To commence operation, a user places a film cassette 24 in the apparatus 20 after moving the sliding door 44 to the open position and placing the cassette face down in the film cassette carriage 46. For securing the cassette 24, the clamping arms 58 are pivoted to overlap and engage the bottom wall 30. Thus, the cassette 24 is in a stable orientation during an operating cycle.

To commence printing, the switch 50 is actuated. In response thereto, an operating program of the microcomputer in the control circuit 74 is effective to energize the motor 140. The film picking mechanism 150 is operative to eject the dark slide from the film cassette 24 and the housing assembly 42 by the processing rollers 144, 146. Thereafter, the control circuit 74 actuates the driving motor 66 so that the lead screw 70 rotates in a direction which is effective for moving the film cassette carriage 46 in a retraction direction towards the start printing direction. When the switch contact 76 engages the limit switch 78, this is effective to cause the control circuit 74 to stop the driving motor 66. Following the foregoing, the apparatus 20 is ready, after a suitable time delay, to generate and expose or print images on image forming areas 22a of successive film units. Raster scanning of the image to be printed is achieved as follows. The control circuits 74 includes circuitry effective to again operate the motor 66. As noted, operation of the motor 66 drives synchronously the fast and slow scanning movements. Hence, a single driving means is responsible for driving both fast and slow scanning movements.

For effecting the fast scanning movement, the shaft 88 rotates the cam 86 which is responsible for driving the scanning mirror 90. As pointed out, the scanning mirror 90 moves in equal increments across the scan line, thereby insuring that each spot on the film unit 22 will be imaged by respective ones of the light emitting diodes 106a–c. Equal increments minimize scan distortion. One rotation of the cam 86 is effective to image the scan line and cause a rapid retrace of the mirror 90 to its normal condition at the beginning of the line scanning cycle.

Synchronously with the fast scanning, the slow scanning is performed. In this regard, operation of the drive motor 66 causes simultaneous rotation of the lead screw 70, thereby synchronously advancing the film cassette carriage 46. The combined effect of slow and fast scanning movements results in raster scanning of the image on the image forming areas 22a. Significantly, the energization of the light emitting diodes 106a–c is synchronous to the slow and fast scanning. This is because the energization is synchronous with the rotation of the motor 66 since the encoder ticks are proportional to the speed of the encoder wheel 102. Accordingly, the motor 66 can be run in an open loop mode without expensive controls for its operation and the printing or exposure of exposure lines will be uniform despite fluctuations in motor speed caused by for example variations in power to the motor. Each encoder tick is responsible for causing a predetermined number of pixels to be emitted by the diodes 106a–c. Image data received by the microcomputer from any well-known source, such as magnetic tape or disc is thereafter directed to modulate the intensity of the output of the light emitting diodes.

It will be appreciated that optical imaging system 116 directs the light of the light emitting diodes 106a–c onto the planar focal plane formed by the flexible film flattener 121 at the image forming surface 22a. As noted, the optical system 116 insures that the images of the spots along the scanning line are within acceptable tolerances for size.

When the switch contact 76 engages the limit switch 78, the control circuit 74 is effective to commence operation of the film processing mechanism 136 for ejecting and processing the just exposed film unit 22 from the cassette 24 and the housing assembly 42 in the manner noted above.

The present invention may be embodied in other specific forms without departing from the spirit or essential characteristics thereof. The present embodiment is, therefore, to be considered in all respects as illustrative and not restrictive. The scope of the invention being indicated by the appended claims rather than by the foregoing description and all changes which come within the meaning and the range of equivalency of the claims are therefore intended to be embraced therein.

What is claimed is:

1. An electronic image printing apparatus for printing images on respective ones of a plurality of image recording units which are releasably retained in a cassette therefor, said apparatus comprising:
    a housing assembly having means for allowing entry and removal of the cassette;
    means disposed in said housing assembly for mounting the cassette for movement in at least a printing direction along a predetermined path;
    means for providing at least a beam of light;
    means for modulating said means for providing the light beam in response to electronic signals corresponding to an image of a subject selected for printing;
    light scanning means operable for scanning the modulated light beam across a preselected scanning line of the image recording units;
    optical means for directing the modulated light beam to said light scanning means and from said light scanning means to an image plane of one of the image recording units;
    means operable for driving said cassette mounting means and the cassette in said printing direction as said light scanning means scans the modulated light beam across the scanning line, such that the combination of movement provided by said light scanning means and said cassette driving means results in a raster scan image of the subject on the image recording unit by the modulated light beam; and,
    means disposed in said housing assembly for ejecting successive scanned recording units from the cassette and said housing assembly.

2. The apparatus of claim 1 wherein: the recording units are arranged in a stack and are of the self-developing photosensitive film type and said means for ejecting includes means for processing successive ones of the scanned film units; said processing means including a pair of processing rollers which is operable to advance successive film units from the cassette and said housing assembly; said ejecting means includes a film unit picking mechanism which is operable to urge respective ones of the film units from the cassette to said processing roller which are operable to process the film unit and to continue its advancement from the cassette and said housing assembly.

3. The apparatus of claim 2 further including: means for flattening the film units along the scanning line at a focal plane of the film unit.

4. The apparatus of claim 1 wherein: said means for providing a modulated beam of light includes a plurality of light emitting elements disposed in spaced apart relationship in a generally horizontal plane and energizable for emitting light in respectively different spectral wavelengths.

5. The apparatus of claim 4 wherein: said light emitting elements are light emitting diodes.

6. The apparatus of claim 4 wherein: said light scanning means includes an oscillatable mirror assembly having a cam following member; a driving motor; and a camming member driven by said driving motor; said cam following member drivable by said camming member to thereby drive said mirror assembly in such a manner as to scan the scanning line, whereby said scanning of said mirror assembly is done so that each pixel from said light providing means is displaced by a constant amount.

7. The apparatus of claim 6 wherein: said driving means for said cassette mounting means includes said driving motor; a lead screw synchronously rotatably driven by said driving motor; coupling means coupled to and between said driving means and said lead screw for converting bidirectional rotational movement of said lead screw to bidirectional linear advance of said cassette mounting means.

8. The apparatus of claim 7 wherein: said modulating means includes means responsive to rotation of said driving motor for operating said light providing means in synchronization to movement of said mirror assembly and movement of said cassette mounting means.

9. The apparatus of claim 8 wherein: said responsive means includes an encoder mechanism which is operatively coupled to said driving motor.

10. The apparatus of claim 3 wherein: said film flattener is a low-friction member which engages slightly the film unit so as not to impede movement of said cassette mounting means or scratch the film unit.

11. The apparatus of claim 4 wherein: one of said light emitting elements emits blue light having an image spot size which is larger than the image spot size of other ones of said light emitting elements.

12. The apparatus of claim 7 wherein: said coupling means includes a flexible strap which is rigid enough to transfer the linear advance in either direction along said predetermined path and accepts misalignment of said lead screw and resists torsional friction between said lead screw and said coupling means.

13. The apparatus of claim 1 wherein: said optical means includes a preobjective lens system which insures that the beam of light is generally in focus on the image plane across the scanning line.

14. An electronic image printing apparatus for printing images on an image recording medium; said apparatus comprising:
a housing assembly;
means disposed in said housing assembly for mounting the recording medium for movement in at least a printing direction along a predetermined path;
means for providing at least a beam of light;
means for modulating said means for providing the light beam in response to electronic signals corresponding to an image of a subject selected for printing;
light scanning means operable for scanning the modulated light beam across a preselected scanning line of the image recording medium;
optical means for directing the modulated light beam to said light scanning means and from said light scanning means to an image plane of one of the image recording medium;
means operable for driving the medium in said printing direction as said light scanning means scans the modulated light beam across the scanning line, such that the combination of movement provided by said light scanning means and said driving means results in a raster scan image of the subject on the image recording medium by the modulated light beam; and,
means operable for synchronously controlling said scanning means, said driving means and said modulating means so that the images are recorded on the image recording medium in an open loop controlled arrangement.

15. The apparatus of claim 14 wherein: said synchronously controlling means includes a driving motor which is directly coupled to said scanning means, said driving means and said modulating means.

16. The apparatus of claim 15 wherein: said light scanning means includes a light deflecting assembly; and a camming member driven by said driving motor; said light deflecting assembly being directly coupled to said camming member to thereby drive said light deflecting assembly in such a manner as to scan a scanning line, whereby said scanning of said light deflecting assembly is done so that each pixel from said light providing means is displaced by a constant amount.

17. An electronic image printing apparatus for printing images on an image recording medium, said apparatus comprising:
a housing assembly;
means disposed in said housing assembly for mounting the recording medium for movement in at least a printing direction along a predetermined path;
means for providing at least a beam of light;
means for modulating said means for providing the light beam in response to electronic signals corresponding to an image of a subject selected for printing;
light scanning means operable for scanning the modulated light beam across a preselected scanning line of the image medium;
optical means for directing the modulated light beam to said light scanning means and from said light scanning means to an image plane of the image medium; and,
means operable for driving said mounting means and the medium in said printing direction as said light scanning means scans the modulated light beam across the scanning line, such that the combination of movement provided by said light scanning means and said medium driving means results in a raster scan image of the subject on the image recording medium by the modulated light beam;
said light scanning means includes a light deflecting assembly; a driving motor; and a camming member driven by said driving motor; said light deflecting assembly being drivable by said camming member to thereby drive said light deflecting assembly in such a manner as to scan the scanning line, whereby said scanning of said light deflecting assembly is done so that each pixel from said light providing means is displaced by a constant amount;
said driving means for said medium mounting means includes said driving motor; a lead screw synchronously rotatably driven by said driving motor; and coupling means coupled to and between said driving means and said lead screw for converting bidirectional rotational movement of said lead screw to bidirectional linear advance of said mounting means;
said modulating means includes means responsive to rotation of said driving motor for operating said light providing means in synchronization to movement of said light deflecting assembly and movement of said medium mounting means.

* * * * *